(12) United States Patent
Park

(10) Patent No.: US 7,364,214 B2
(45) Date of Patent: Apr. 29, 2008

(54) CONTROL APPARATUS AND METHOD FOR OPENING AND CLOSING TAILGATE USING ANGULAR SENSOR

(75) Inventor: Chun-Kyu Park, Incheon Metropolitan (KR)

(73) Assignee: Hyundai Motor Company, Seoul (KR)

( * ) Notice: Subject to any disclaimer, the term of this patent is extended or adjusted under 35 U.S.C. 154(b) by 264 days.

(21) Appl. No.: 11/117,211

(22) Filed: Apr. 28, 2005

(65) Prior Publication Data

US 2005/0269833 A1    Dec. 8, 2005

(30) Foreign Application Priority Data

Jun. 4, 2004    (KR) .................... 10-2004-0040832

(51) Int. Cl.
*B62D 25/12* (2006.01)

(52) U.S. Cl. .................. 296/76; 49/324; 49/339

(58) Field of Classification Search .............. 296/76, 296/146.8, 146.4; 49/324, 356, 503, 357

See application file for complete search history.

(56) References Cited

U.S. PATENT DOCUMENTS 6,902,219 B2 *    6/2005    Hess et al. .................... 296/76

FOREIGN PATENT DOCUMENTS

| KR | 20-0178097 | 5/2000 |
| KR | 1020030003915 A | 1/2003 |
| KR | 1020030041185 A | 5/2003 |

* cited by examiner

*Primary Examiner*—Joseph D Pape
(74) *Attorney, Agent, or Firm*—Morgan Lewis & Bockius LLP

(57) ABSTRACT

An apparatus for improving the opening and closing function of a tailgate equipped with a gas lifter includes a sensor for detecting an opened angle of the tailgate from a vehicle body. An Electronic Control Unit receives a detected angle from the sensor and outputs a pressure regulating control signal. A gas lifter regulates the pressure of a cylinder according to the control signal of the Electronic Control Unit.

6 Claims, 6 Drawing Sheets

CONTROL APPARATUS AND METHOD FOR OPENING AND CLOSING TAILGATE USING ANGULAR SENSOR

CROSS-REFERENCE TO RELATED APPLICATIONS

The present application is based on, and claims priority from, Korean Application Serial Number 10-2004-0040832, filed on Jun. 4, 2004, the disclosure of which is hereby incorporated by reference herein in its entirety.

FIELD OF THE INVENTION

The present invention relates to a control apparatus for opening and closing a vehicular tailgate using an angular sensor and a method thereof adapted to improve the opening and closing function of the tailgate.

BACKGROUND OF THE INVENTION

Generally, a vehicular tailgate (or engine hood, trunk lid or the like) is mounted with a gas lifter to maintain the opened state of the tailgate. The tailgate is typically larger and heavier than a vehicle door, and should easily be opened and closed with a small amount of power. Further, the tailgate should remain opened when the tailgate is completely opened.

The conventional gas lifter used for the tailgate to generate high pressure gas is superior in correcting the gas pressure of the cylinder. However, the gas lifter has been difficult to use in practice due to its heavy weight, expensive material cost, significant occupation of an installment area and difficulty of manufacture. For other methods, the hinge structure is modified or pressure in the cylinder is manually changed to improve the opening and closing function of the tailgate. However, an excessive force is required for opening the tailgate or the tailgate may close suddenly, causing potential injury to the user in case his or her body part gets stuck between the vehicle body and tailgate.

SUMMARY OF THE INVENTION

Embodiments of the present invention provide an opening and closing function of a tailgate to thereby allow the user to open and close the tailgate with a small amount of power.

In one embodiment, a control apparatus for opening and closing a tailgate includes a sensor for detecting an opened angle of the tailgate from a vehicle body. An Electronic Control Unit (ECU) receives a detected angle from the sensor and outputs a pressure regulating control signal. A gas lifter regulates the pressure in a cylinder according to the pressure regulating control signal of the ECU.

In another embodiment, a control method for opening and closing a tailgate includes receiving a tailgate switch signal or a tailgate key set signal at an Electronic Control Unit (ECU) of a vehicle; receiving a present opened angle of the tailgate from a sensor when the signal is inputted; comparing the inputted opened angle of the tailgate with predetermined first, second and third angles that successively have large values to adjust the pressure of a gas lifter; and while opening the tailgate, maintaining the pressure in the gas lifter at a predetermined first pressure if the detected angle is determined to be between zero degree and the predetermined first angle as a result of the above comparison, maintaining the pressure in the gas lifter at a predetermined second pressure if the detected angle is between the predetermined first angle and the predetermined second angle, maintaining the pressure in the gas lifter at a predetermined third pressure if the detected angle is between the predetermined second angle and the predetermined third angle, and while closing the tailgate, maintaining the pressure in the gas lifter at the predetermined third pressure if the detected angle is determined to be between the predetermined second angle and the predetermined third angle, maintaining the pressure in the gas lifter at a predetermined fourth pressure if the detected angle is between the predetermined first angle and the predetermined second angle, and maintaining the pressure in the gas lifter at the predetermined first pressure if the detected angle is between zero degree and the predetermined first angle.

Thus, when the user opens or closes the vehicle tailgate, the ECU of the present invention detects the opened degree of the tailgate by using an angular sensor disposed at an upper end of the tailgate and then adjusts the pressure of the gas lifter, thereby enabling the tailgate to be opened and closed with a small amount of power.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Figure 1:
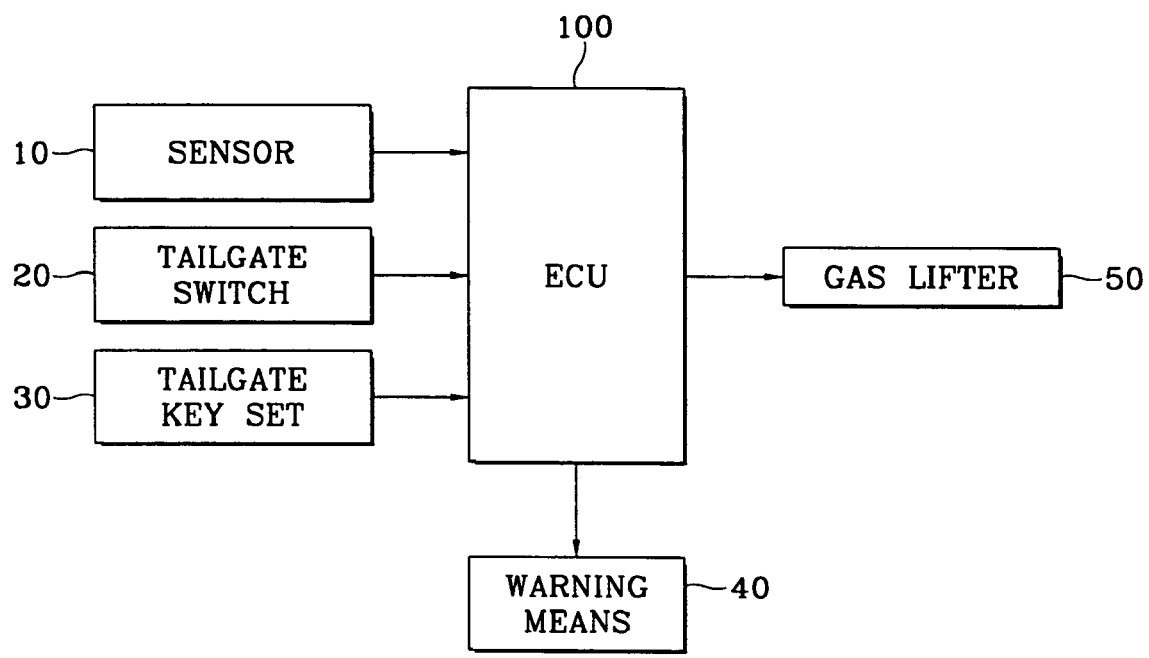
FIG. 1 is a block diagram of a control apparatus for opening and closing a tailgate according to an embodiment of the present invention.

With reference to FIG. 1, a control apparatus according to one embodiment of the invention for opening and closing a tailgate includes a sensor 10 located at an upper end of the tailgate of a vehicle for detecting an opened angle of the tailgate from a vehicle body. An Electronic Control Unit (ECU) 100 receives the detected angle from sensor 10 and then outputs a pressure regulating control signal. A gas lifter 50 regulates the pressure in a cylinder according to the pressure regulating control signal of ECU 100. Sensor 10 according to an embodiment of the present invention may be an angular sensor.

ECU 100 detects whether the tailgate is open by receiving a tailgate switch signal and a tailgate key set signal from a tailgate switch 20 and a tailgate key set 30. As is well known, tailgate switch 20 is placed at the interior of the driver's door. Tailgate key set 30 indicates a key insertion portion on the tailgate. A warning means 40 outputs a warning signal or warning sound according to a control signal of ECU 100 to thereby inform the driver of the open tailgate.

Figure 2:
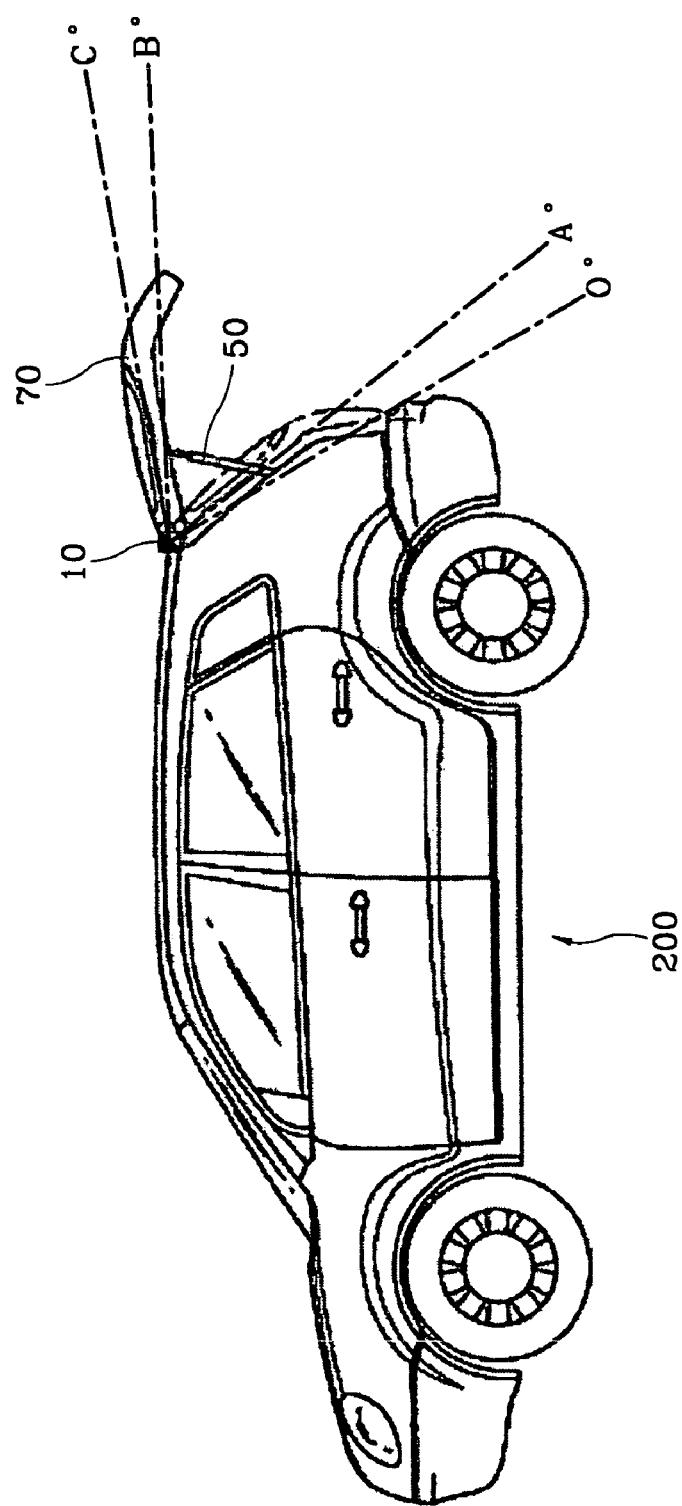
FIG. 2 illustrates a sensor installed at a tailgate according to an embodiment of the present invention.

As illustrated in FIG. 2, sensor 10 (i.e., the angular sensor) according to one embodiment of the present invention is located at an upper end of a tailgate 70. The angular sensor detects an opened angle of tailgate 70 from a vehicle body 200 and transmits the result to the ECU (not shown). The ECU outputs a control signal to regulate the pressure of gas lifter 50.

The pressure of gas lifter 50 is adjusted by comparing the open angle (detected through sensor 10) of tailgate 70 with predetermined 0°, A°, B°, and C°. The predetermined reference angles A°, B°, and C° are differently set according to the size and weight of the tailgate in various kinds of vehicles. The angular range from 0° to A° and from B° to C° are identically 15° in one embodiment exemplary of the present invention; however, the angles and range between angles is not limited to the above value.

Figure 3:
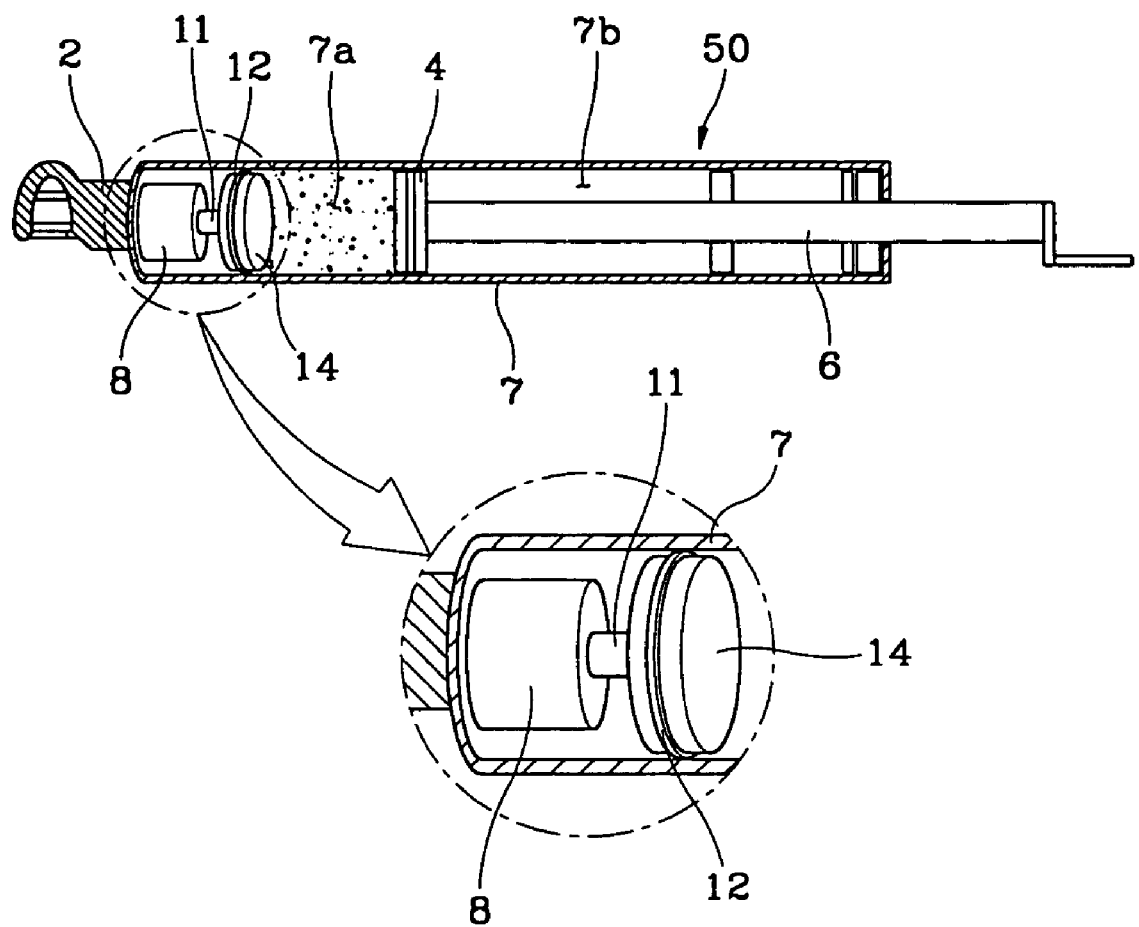
FIG. 3 illustrates a gas lifter according to an embodiment of the present invention.

The pressure of gas lifter 50 is adjusted according to the pressure regulating control signal of ECU 100. Referring to FIG. 3, gas lifter 50 includes a hinge part 2 and a cylinder 7. Hinge part 2 is pivotably installed at a connecting portion of a trunk body. Cylinder 7 is mounted with a piston rod 6, motor 8, first and second chambers 7a and 7b, pressure regulating plate 14, and length varying means 11. Piston rod 6 is pivotably installed at a connecting portion (not shown) of tailgate 70 and includes a piston 4 that moves back and forth when tailgate 70 is opened and closed. First and second chambers 7a and 7b are filled with gas that is compressed by piston 4 assembled with piston rod 6. The gases in first and second chambers 7a and 7b of cylinder 7 move through a gas moving groove (not shown) formed on piston 4.

Motor 8 is disposed opposite to piston rod 6 in cylinder 7 and operates in response to the pressure regulating control signal of ECU 100. Pressure regulating plate 14 is connected to motor 8 and changes its position according to the operation of motor 8 to vary the pressure of first and second chambers 7a and 7b in cylinder 7.

The movement of pressure regulating plate 14 according to the operation of motor 8 is performed via length varying means 11. Length varying means 11 is connected at one end thereof to motor 8 while the other end is connected to pressure regulating plate 14. Length varying means 11 changes the disposition of pressure regulating plate 14 by being varied in length according to the operation of motor 8 that moves laterally. The power supply to motor 8 according to the control signal of ECU 100 is not shown; however, the supply method can be variously embodied by a person of ordinary skill in the art based on the teachings contained herein.

Pressure regulating plate 14 is installed at the outer periphery thereof with a rubber seal 12. Rubber seal 12 prevents gas leakage toward motor 8 by reinforcing the sealing property between the inner wall of cylinder 7 and pressure regulating plate 14.

Figure 4A:
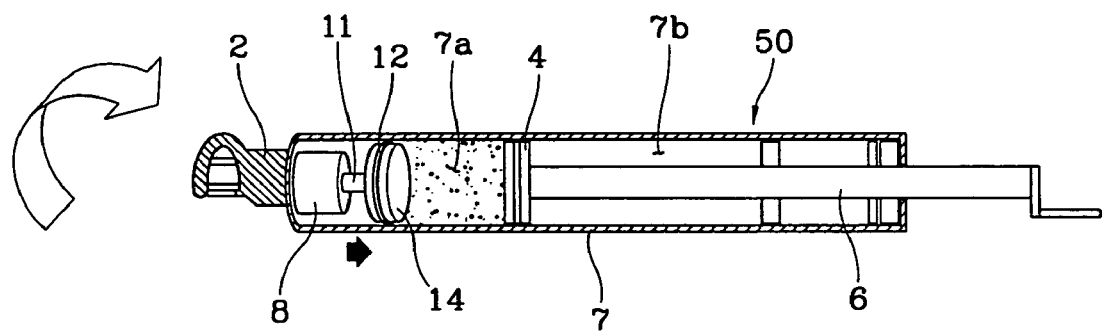
FIGS. 4a and 4b illustrate operation states of a gas lifter according to an embodiment of the present invention.
Figure 4B:
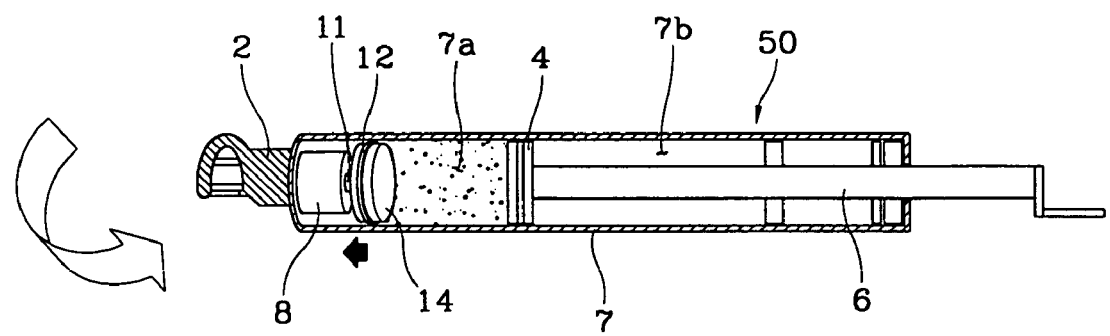

The operation of gas lifter 50 according to the embodiment of the present invention will now be described with reference to FIGS. 4a and 4b.

While tailgate 70 is being opened and the open angle of tailgate 70 is between A° and B°, a high internal pressure is required. As illustrated in FIG. 4a, if motor 8 operates toward the left direction according to the pressure regulating control signal of ECU 100, length varying means 11 activates in response to the operation of motor 8 and pushes (see arrow in the drawing) pressure regulating plate 14 coupled to one end of length varying means 11. Thus, the pressure in first chamber 7a of cylinder 7 increases.

While tailgate 70 is being closed and the open angle of tailgate 70 is between A° and B°, a low internal pressure is required. As illustrated in FIG. 4b, if motor 8 operates toward the right direction according to the pressure regulating control signal of ECU 100, length varying means 11 activates in response to the operation of motor 8 and pulls (see arrow in the drawing) pressure regulating plate 14 coupled to one end of length varying means 11. Thus, the pressure in first chamber 7a of cylinder 7 decreases.

Thus, according to embodiments of the present invention, the user can open and close tailgate 70 with a small amount of power. Additionally, tailgate 70 is gradually closed by adjusting the pressure of gas lifter 50, and when completely opened, tailgate 70 is stably kept in the opened state, thus preventing injury to the user in case his or her body part gets stuck between the vehicle body and tailgate 70.

A control method for opening and closing a tailgate will now be described with reference to FIG. 2 and the flowcharts of FIGS. 5a and 5b.

Hereinafter, the degrees of the predetermined first, second, third and fourth control pressures of gas lifter 50 adjusted according to the predetermined first (A°), second (B°) and third (C°) opened angles of tailgate 70 preferably range from smallest to biggest in the order of the predetermined fourth pressure, the predetermined first pressure, the predetermined second pressure, and the predetermined third pressure.

Figure 5A:
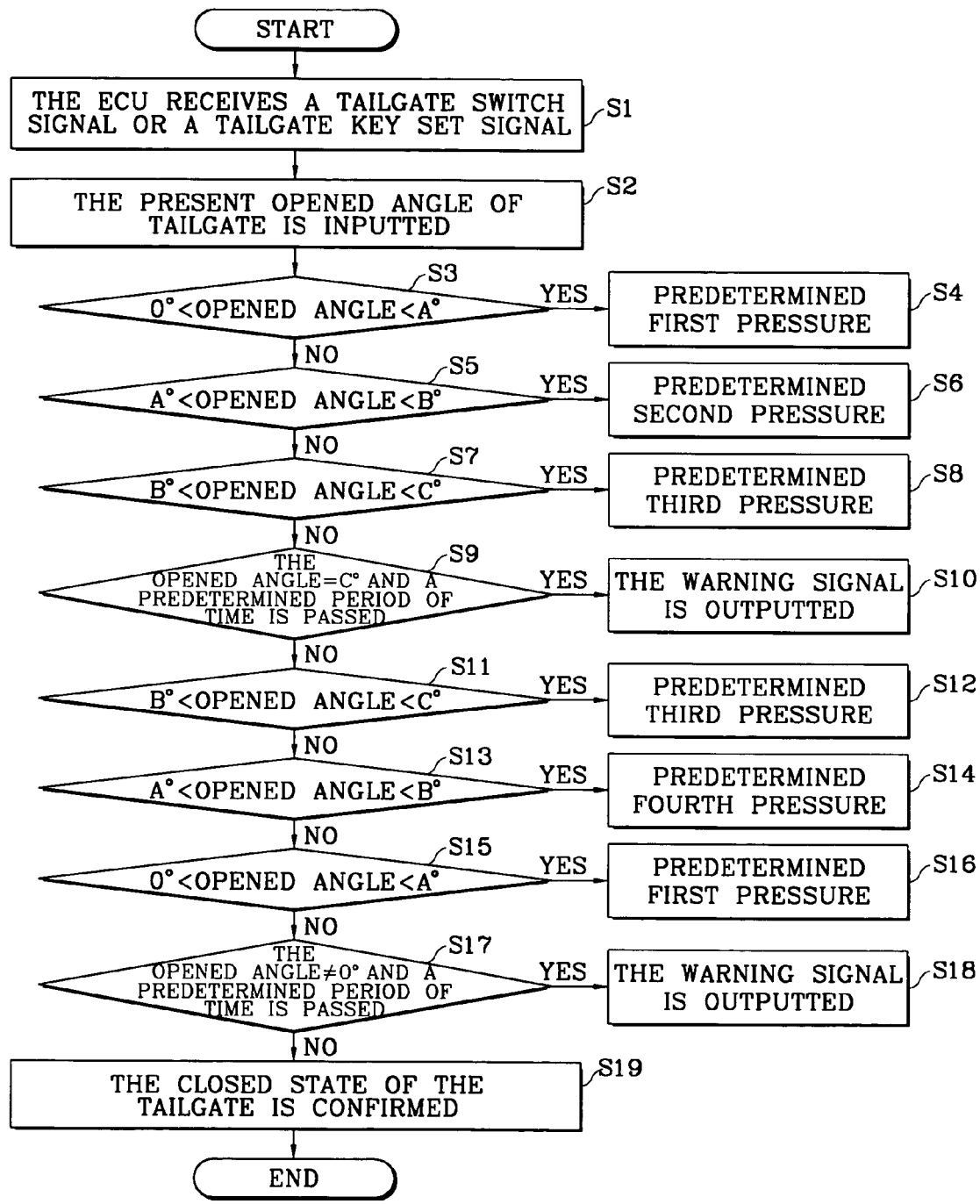
FIGS. 5a and 5b illustrate flowcharts of a control method for opening and closing a tailgate according to an embodiment of the present invention.

Referring first to FIG. 5a, if a tailgate switch signal or a tailgate key set signal is inputted into the vehicular ECU (step 1), the ECU receives a present opened angle of tailgate 70 from the sensor (step 2).

After receiving the present opened angle of tailgate 70 in step 2, the ECU compares the inputted open angle of the tailgate with the predetermined first, second and third angles (A°, B° and C°) to adjust the pressure of the gas lifter.

While opening tailgate 70 (determined by the ECU being inputted with either the tailgate switch signal or key set signal), if the present detected angle of tailgate 70 is determined to be between zero degree and first angle (A°) (step 3), the pressure in the gas lifter is maintained at the predetermined first pressure (normal internal pressure) (step 4). If the detected angle of tailgate 70 is between the predetermined first angle (A°) and the predetermined second angle (B°) (step 5), the pressure in the gas lifter is maintained at the predetermined second pressure (higher internal pressure than the predetermined first pressure) (step 6). If the detected angle of tailgate 70 is between the predetermined second angle (B°) and the predetermined third angle (C°) (step 7), then the pressure in the gas lifter is maintained at the predetermined third pressure (higher internal pressure than the predetermined second pressure), thereby firmly supporting tailgate 70 (step 8).

When the detected angle of the tailgate is at the predetermined third angle where tailgate 70 is maximally opened, and a predetermined period of time is passed (step 9), then the ECU outputs a warning signal by determining that tailgate 70 is in an opened state (step 10).

While closing tailgate 70 (the ECU determines whether the open angle of tailgate 70 has deviated from C°), if the detected present angle of tailgate 70 is determined to be between the predetermined second angle (B°) and the predetermined third angle (C°) (step 11), the pressure in the gas lifter is maintained at the predetermined third pressure (step 12). If the detected angle of tailgate 70 is between the predetermined first angle (A°) and the predetermined second angle (B°) (step 13), the pressure in the gas lifter is maintained at the predetermined fourth pressure (lower internal pressure than the predetermined first pressure) (step 14).

Provided that the detected angle of tailgate 70 is between zero degree and the predetermined first angle (A°) (step 15), the pressure in the gas lifter is maintained at the predetermined first pressure (normal internal pressure) (step 16) and then the closed state of tailgate 70 is confirmed (step 19).

When confirming the closed state of tailgate 70 in step 19, if the ECU determines that the detected angle of tailgate 70 is not zero degree and a predetermined period of time is passed (step 17), then the ECU outputs a warning signal to warning means 40 by determining that tailgate 70 is not completely closed (step 18).

Figure 5B:
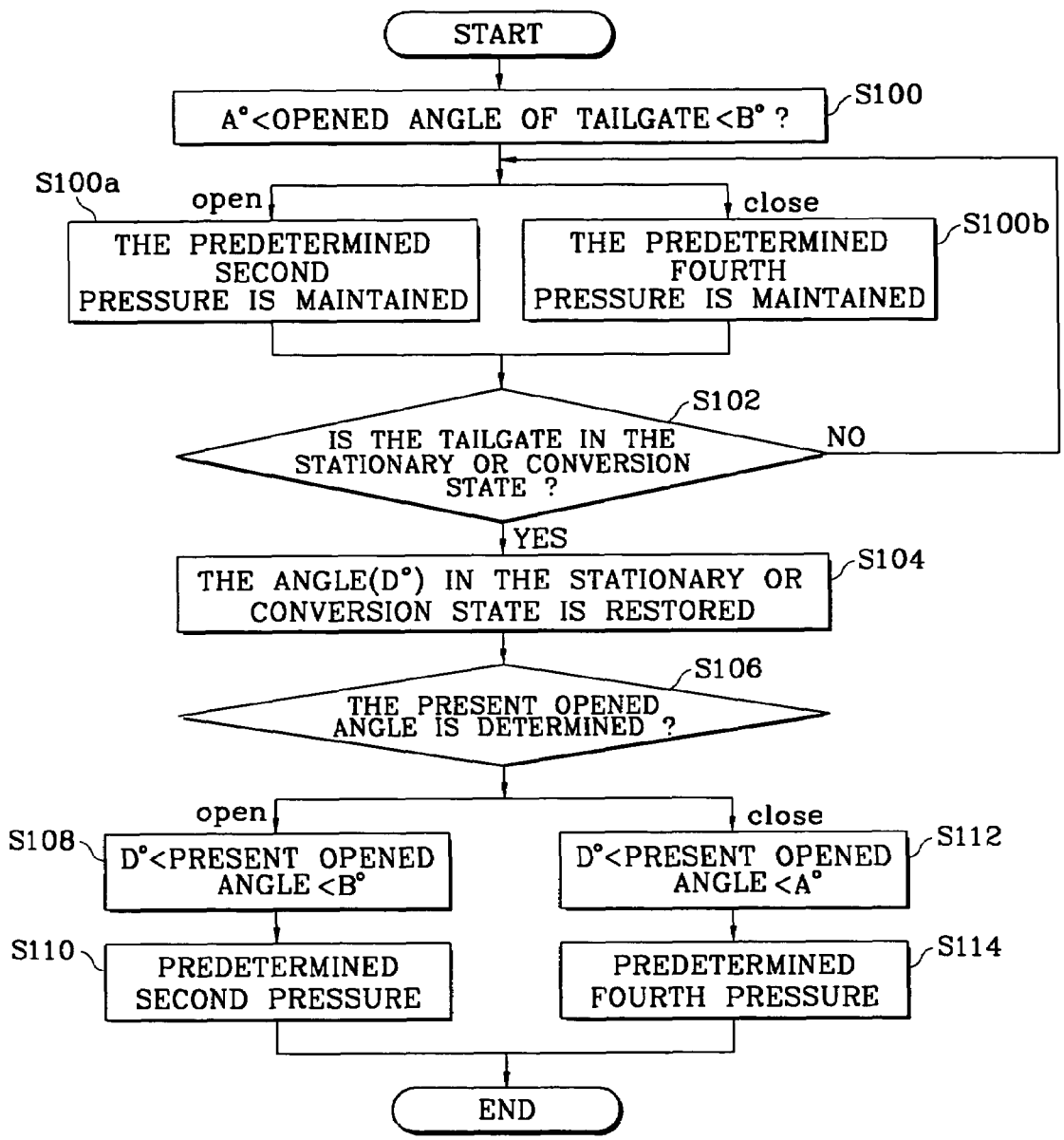

A control method in consideration of the stationary or conversion state of tailgate 70 from opening to closing or vice versa is illustrated in FIG. 5*b* in which the predetermined second pressure or the predetermined fourth pressure relevant to the opening or closing of tailgate 70 is maintained when the detected angle is between the predetermined first angle (A°) and the predetermined second angle (B°) during the opening or closing of tailgate 70.

In case the detected angle of tailgate 70 during opening or closing is between the predetermined first angle (A°) and predetermined second angle (B°) (step 100), the predetermined second pressure (step 100*a*) or predetermined fourth pressure (step 100*b*) relevant to the opening or closing of tailgate 70 is maintained. The ECU determines whether tailgate 70 is in the stationary or conversion state from opening or closing (step 102).

If tailgate 70 is in the stationary or conversion state from opening or closing in step 102, the opened angle (D°) of tailgate 70 in the stationary or conversion state is restored (step 104). The opened angle of tailgate 70 restored in step 104 is compared with the present opened angle of tailgate 70 (step 106).

If the present opened angle of tailgate 70 is determined to be between the restored opened angle and the predetermined second angle (B°) as a result of step 106 (step 108), the ECU determines that tailgate 70 is in an opened state and maintains the pressure of the gas lifter at the predetermined second pressure (higher internal pressure than the predetermined first pressure) (step 110). However, if the present opened angle of tailgate 70 is determined to be between the restored opened angle (D°) and predetermined first angle (A°) (step 112), the ECU determines that tailgate 70 is in a closed state and maintains the pressure of the gas lifter at the predetermined fourth pressure (lower internal pressure than the predetermined first pressure) (step 114).

Thus, the pressure in the gas lifter is flexibly adjustable when tailgate 70 is closed right after being opened or vice versa between A° and B° (see FIG. 2).

Though the predetermined pressures are set from smallest to biggest in the order of the predetermined fourth pressure, the predetermined first pressure, the predetermined second pressure, the predetermined third pressure in one embodiment of the present invention, the predetermined first (A°), second (B°) and third (C°) opened angles of tailgate 70 and predetermined first, second, third and fourth control pressures of gas lifter 50 can be changed depending on the size, weight and the like of tailgate 70 of the vehicle.

The apparatus described above for improving the opening and closing function of the tailgate can be applied to a vehicular hood mounted with the gas lifter, or the like.

The technical concept of the present invention is not be limited to the above embodiment but should be determined by a logical interpretation.

As apparent from the foregoing, there is an advantage in that the opening and closing function of the tailgate of the vehicle is improved, enabling to open and close the tailgate with a small amount of power.

What is claimed is:

1. A control apparatus for opening and closing a tailgate, comprising:
   a sensor for detecting an open angle of said tailgate from a vehicle body;
   an Electronic Control Unit that receives a detected open angle from said sensor and outputs a pressure regulating control signal; and
   a gas lifter that regulates pressure in a cylinder according to the pressure regulating control signal of said Electronic Control Unit, wherein said gas lifter comprises:
   a hinge part pivotably installed at a connecting portion of a trunk body;
   a piston rod pivotably installed at a connecting portion of said tailgate and including a piston that moves back and forth while said tailgate is opened and closed;
   a cylinder formed with first and second chambers packed with gas that is compressed by said piston;
   a motor disposed opposite to said piston rod in said cylinder and operating in response to the pressure regulating control signal of said Electronic Control Unit; and
   a pressure regulating plate connected to said motor and changed in position according to the operation of said motor to vary pressure of said first and second chambers in said cylinder.

2. The apparatus as defined in claim 1, wherein said sensor is located at an upper end of said tailgate of a vehicle and includes an angular sensor.

3. The apparatus as defined in claim 1, further comprising warning means to output a warning signal or a warning sound according to a control signal of said Electronic Control Unit.

4. The apparatus as defined in claim 1, wherein said Electronic Control Unit receives a tailgate switch signal and a tailgate key set signal from a tailgate switch and a tailgate key set.

5. The apparatus as defined in claim 1, further comprising length varying means connected at one end thereof to said motor while the other end is connected to said pressure regulating plate, said length varying means changing the disposition of said pressure regulating plate by being varied in length according to the operation of said motor that moves laterally.

6. The apparatus as defined in claim 1, wherein said pressure regulating plate is installed at an outer periphery thereof with a rubber seal.

* * * * *